United States Patent
Omran et al.

(10) Patent No.: US 10,094,470 B2
(45) Date of Patent: Oct. 9, 2018

(54) SYSTEMS AND METHOD OF DETERMINING PTO TRANSMISSION GEAR RATIO

(71) Applicant: CNH Industrial America LLC, New Holland, PA (US)

(72) Inventors: Ashraf Mohammed Kandeel Omran, Clarendon Hills, IL (US); Brian Allen Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 315 days.

(21) Appl. No.: 15/166,512

(22) Filed: May 27, 2016

(65) Prior Publication Data

US 2017/0198809 A1     Jul. 13, 2017

Related U.S. Application Data

(60) Provisional application No. 62/277,408, filed on Jan. 11, 2016.

(51) Int. Cl.
    *F16H 61/02*     (2006.01)
    *B60K 17/28*     (2006.01)
    *B60K 25/06*     (2006.01)

(52) U.S. Cl.
    CPC ......... *F16H 61/0204* (2013.01); *B60K 17/28* (2013.01); *B60K 25/06* (2013.01)

(58) Field of Classification Search
None
See application file for complete search history.

(56) References Cited

U.S. PATENT DOCUMENTS

| | | | |
|---|---|---|---|
| 4,344,499 A | 8/1982 | van der Lely et al. | |
| 4,597,301 A | 7/1986 | Weis et al. | |
| 4,760,902 A | 8/1988 | Bellanger | |
| 5,494,142 A | 2/1996 | Kale | |
| 5,601,172 A | 2/1997 | Kale et al. | |
| 6,092,021 A | 7/2000 | Ehlbeck et al. | |
| 6,253,140 B1 | 6/2001 | Jain et al. | |
| 6,267,189 B1 | 7/2001 | Nielsen et al. | |
| 6,517,465 B2 | 2/2003 | Hrazdera | |
| 6,616,559 B1* | 9/2003 | Hori ....................... | B62D 11/18 475/218 |
| 7,234,366 B2 | 6/2007 | Hou | |
| 7,377,103 B2 | 5/2008 | Yu et al. | |

(Continued)

*Primary Examiner* — Ramya P Burgess
*Assistant Examiner* — Timothy Hannon
(74) *Attorney, Agent, or Firm* — Rickard K. DeMille; Rebecca L. Henkel

(57) ABSTRACT

A method includes receiving a first shaft speed, measuring a parameter indicative of a PTO shaft speed, determining a PTO shaft acceleration by monitoring the parameter indicative of the PTO shaft speed over time, determining, via a plurality of estimators, a plurality of normalized PTO clutch gear ratios, wherein each of the plurality of estimators determines one of the plurality of normalized PTO clutch gear ratios based, at least in part, on the first shaft speed, the PTO shaft speed, and one of a plurality of known PTO transmission gear ratio options, and selecting one of the plurality of estimators, when the PTO shaft acceleration drops below a threshold value, wherein the normalized PTO clutch gear ratio determined by the selected estimator is about 1.

18 Claims, 8 Drawing Sheets

(56) References Cited

U.S. PATENT DOCUMENTS

| | | | |
|---|---|---|---|
| 8,364,363 B2 | 1/2013 | Nakamura et al. | |
| 9,002,585 B2 | 4/2015 | Porter et al. | |
| 9,079,493 B2 | 7/2015 | Pociask et al. | |
| 2008/0243324 A1* | 10/2008 | Harris | B60K 6/48 |
| | | | 701/22 |
| 2015/0045184 A1 | 2/2015 | Nishimoto | |
| 2016/0040394 A1* | 2/2016 | Monden | B60W 20/20 |
| | | | 414/685 |
| 2016/0082950 A1* | 3/2016 | Monden | F16H 3/725 |
| | | | 477/3 |
| 2016/0281845 A1* | 9/2016 | Pietron | F16H 61/061 |

* cited by examiner

SYSTEMS AND METHOD OF DETERMINING PTO TRANSMISSION GEAR RATIO

CROSS REFERENCE TO RELATED APPLICATIONS

This application claims priority from and the benefit of U.S. Provisional Patent Application No. 62/277,408, entitled "TRANSMISSION AND POWER TAKE-OFF SYSTEMS FOR AN OFF-ROAD VEHICLE," filed Jan. 11, 2016, which is hereby incorporated by reference in its entirety.

BACKGROUND

This disclosure relates generally to power take-offs (PTOs), and more specifically to determining the gear ratio of a PTO transmission.

Power take-offs are typically used in vehicles, such as tractors and trucks, to provide power from an engine of the vehicle to a machine (e.g., an agricultural implement) that may be attached to the vehicle or towed behind the vehicle. For example, in an agricultural application, a tractor may tow an implement (e.g., a tiller, a seeder, a harvester, etc.) over a field in order to perform an agricultural task. A PTO may be coupled to the engine of the vehicle (e.g., via a drive shaft) to provide power to the implement. The PTO may include a PTO clutch to couple and decouple a PTO shaft and the drive shaft and a PTO transmission with multiple gear options. Some vehicles (e.g., small frame tractors) may only be equipped with a single shaft speed sensor along a length of a drive system. Accordingly, a rotational speed of a shaft upstream or downstream of a clutch and/or transmission may not be known when controlling PTO clutch engagement.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a method includes receiving a first shaft speed, measuring a parameter indicative of a PTO shaft speed, determining a PTO shaft acceleration by monitoring the parameter indicative of the PTO shaft speed over time, determining, via a plurality of estimators, a plurality of normalized PTO clutch gear ratios, wherein each of the plurality of estimators determines one of the plurality of normalized PTO clutch gear ratios based, at least in part, on the first shaft speed, the PTO shaft speed, and one of a plurality of known PTO transmission gear ratio options, and selecting one of the plurality of estimators, when the PTO shaft acceleration drops below a threshold value, wherein the normalized PTO clutch gear ratio determined by the selected estimator is about 1.

In a second embodiment, a system includes a sensor configured to sense a parameter indicative of a PTO shaft speed and a controller. The controller includes communication circuitry configured to receive a first shaft speed, a processor configured to determine a PTO shaft acceleration by monitoring the parameter indicative of the PTO shaft speed over time, and a plurality of estimators, wherein each of the plurality of estimators is assigned one of a plurality of known PTO transmission gear ratio options, and wherein each estimator is configured to determine a normalized PTO clutch gear ratio based, at least in part, on the first shaft speed, the PTO shaft speed, and the PTO transmission gear ratio assigned to the estimator, wherein the controller is configured to select the estimator of the plurality of estimators outputting the normalized PTO clutch gear ratio closest to 1 when the PTO shaft acceleration drops below a threshold value.

In a third embodiment, a non-transitory computer readable medium includes executable instructions that when executed cause a processor to determine a PTO shaft acceleration by monitoring a received parameter indicative of a PTO shaft speed over time, determine a plurality of normalized PTO clutch gear ratios, wherein each of the plurality of normalized PTO clutch gear ratios is determined based, at least in part, on a drive shaft speed, the PTO shaft speed, and one of a plurality of known PTO transmission gear ratio options, select one of the plurality of normalized PTO clutch gear ratios, when the PTO shaft acceleration drops below a threshold value, wherein the selected normalized PTO clutch gear ratio is about 1, and control a PTO clutch based, at least in part, on the known PTO transmission gear ratio associated with the selected normalized PTO clutch gear ratio.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Vehicles, such as tractors and trucks, may use power take-offs (PTOs) to provide power from an engine of the vehicle to an implement or attachment that is attached to the vehicle or towed behind the vehicle. The PTO may include a PTO clutch to couple and decouple a PTO shaft and the drive shaft, and a PTO transmission with a plurality of gear options. Some vehicles may only be equipped with a single shaft speed sensor along a length of a drive system. Accordingly, a rotational speed of a shaft upstream or downstream of a clutch and/or transmission may not be known during control of PTO clutch engagement.

The disclosed techniques utilize the measured PTO shaft speed and the known gear ratio options to determine which gear of the PTO transmission is selected. Once the PTO transmission gear ratio is determined, other shaft speeds within the system may be determined. The other shaft speeds within the system may be used to more accurately control PTO clutch engagement.

Figure 1:
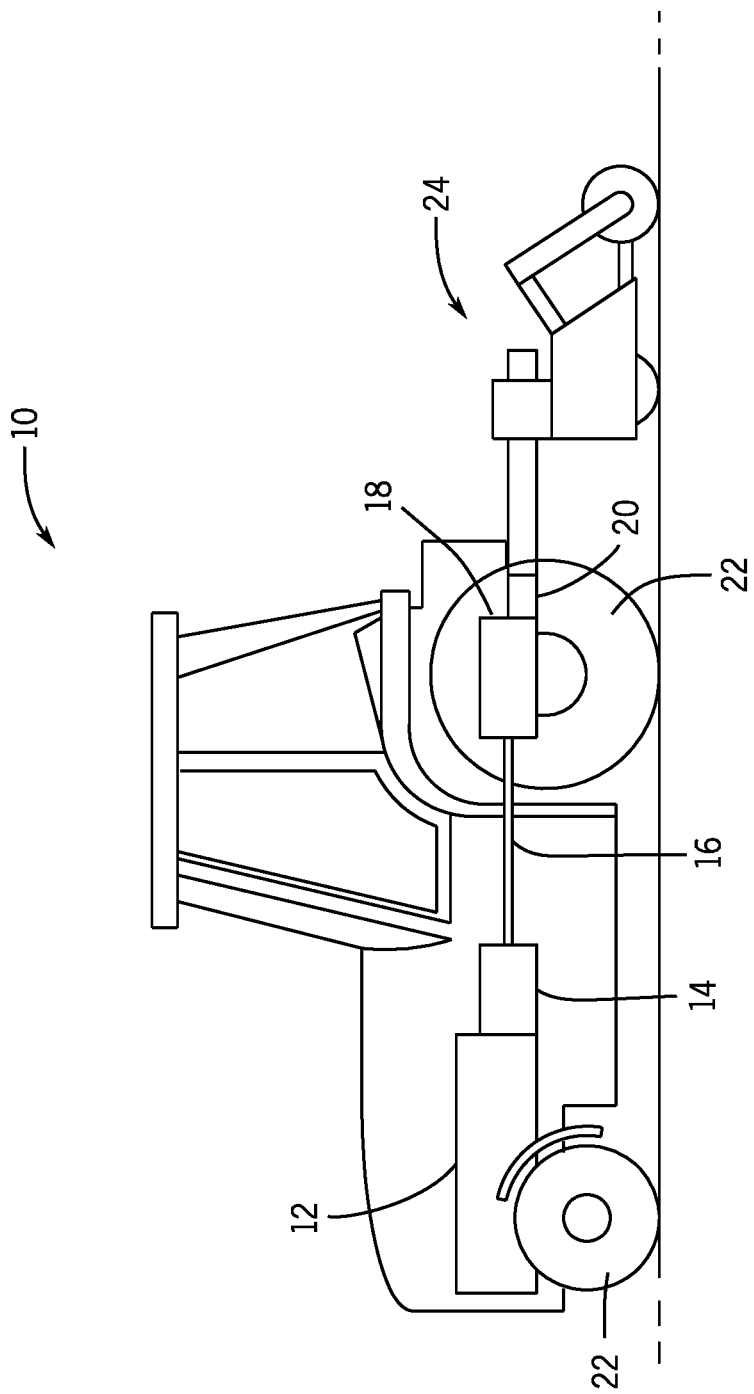
FIG. 1 is a schematic of one embodiment of a tractor towing an implement.

FIG. 1 is a diagram of an off-road vehicle (e.g., a tractor 10), including an engine 12, an engine transmission assembly 14, a drive shaft 16, a power takeoff (PTO) transmission assembly 18, and a PTO shaft 20, in accordance with an embodiment of the present disclosure. The engine transmission assembly 14 is coupled to the engine 12 to transfer power from the engine 12 to the drive shaft 16, which powers wheels 22 of the tractor 10. The PTO transmission assembly 18 is coupled to the engine 12 (e.g., via drive shaft 16) and the PTO shaft 20 such that the engine 12 drives the PTO shaft 20. As will be described below, the PTO transmission assembly may include a PTO clutch that is controlled according to an incremental PID feedback control loop. In some implementations, the tractor 10 may be an autonomous tractor, such that the tractor 10 may be driven without operator input or include automated control, but with an operator present (e.g., supervised autonomy). The tractor 10 may be coupled to an implement 24. The implement 24 may be a raker, tillage implement, mower, seeder, harvester, or any other implement. The implement 24 may be coupled to the PTO shaft 20 such that the PTO shaft 20 powers certain components on the implement 24.

Figure 2:
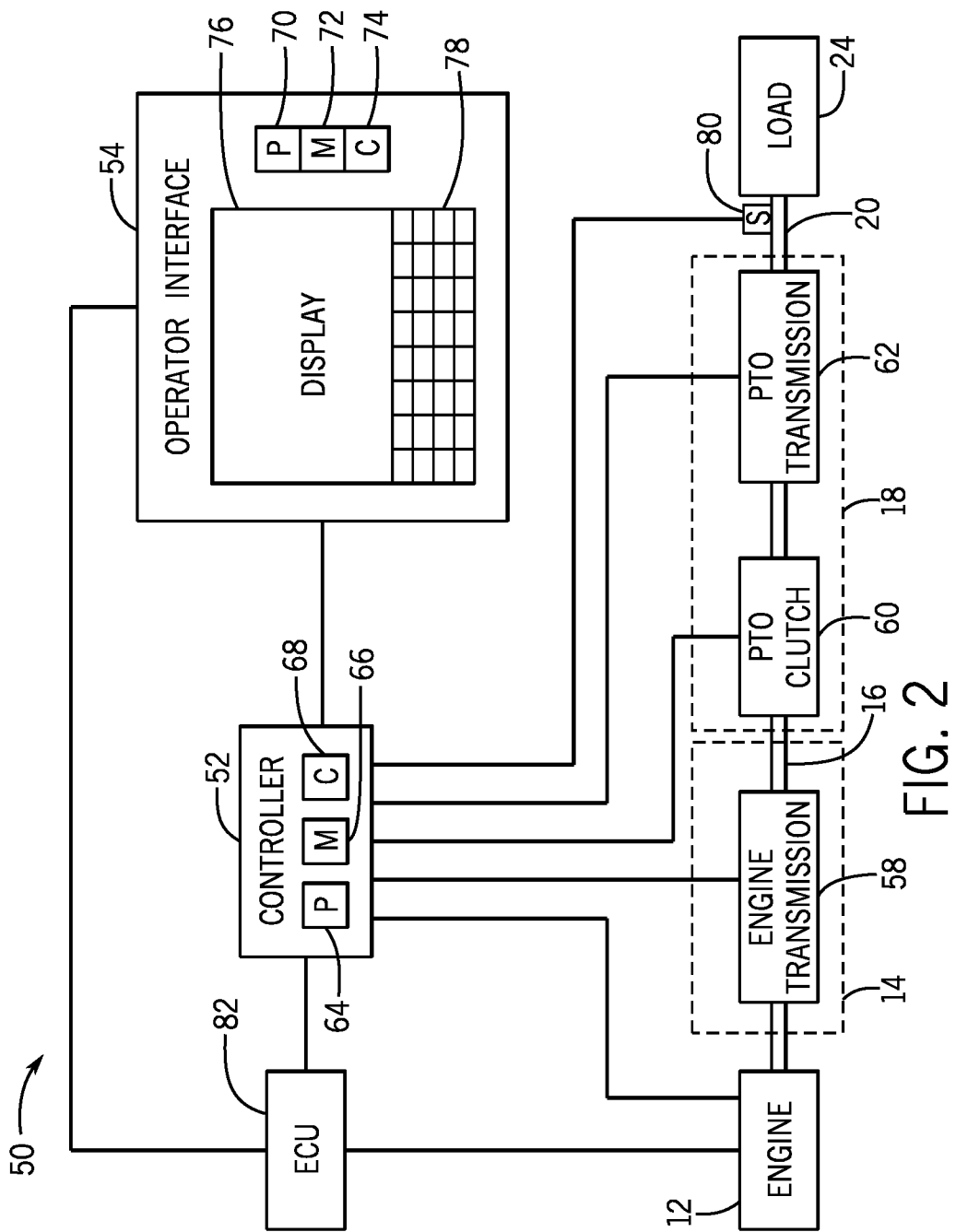
FIG. 2 is a schematic of one embodiment of a drive system of the tractor shown in FIG. 1.

FIG. 2 is a schematic of one embodiment of a drive system 50 of the tractor 10 shown in FIG. 1. In the illustrated embodiment, the drive system 50 includes the engine 12, the engine transmission assembly 14, the drive shaft 16, the PTO transmission assembly 18, the PTO shaft 20, a controller 52, and an operator interface 54. Other embodiments of the drive system 50 may include different elements in alternative combinations.

The engine transmission assembly 14 may include an engine transmission 58. The engine transmission 58 may be a geared transmission or a non-geared transmission, such as a continuously variable transmission. The gear may be selected manually by the user, or automatically via the controller 52.

The PTO transmission assembly 18 may include a PTO clutch 60 and a PTO transmission 62. The PTO clutch 60 may be a push type clutch, a pull type clutch, a single plate clutch a multiple plate clutch, a wet clutch, a dry clutch, a centrifugal clutch, a belt clutch, a dog clutch, a hydraulic clutch, an electromagnetic clutch, or any other type of clutch. The PTO clutch 60 may be configured to engage and lock up in order to couple and decouple the PTO shaft 20 from the drive shaft 16 (and the engine 12). When the engine 12 is running, the drive shaft 16 is rotating, and the PTO transmission 62 and PTO shaft 20 are decoupled from the drive shaft 16, the PTO clutch 60 may be engaged to bring the PTO transmission 62 and PTO shaft 20 up to speed with the drive shaft 16. The PTO clutch 60 may then be locked up to couple the PTO transmission 62 and PTO shaft 20 to the engine 12, such that the engine 12 rotates the PTO shaft 20 (e.g., via the drive shaft 16). The PTO clutch 60 may be engaged in order to enable the PTO shaft 20 to slow down, or so the PTO transmission 62 can change gears. As discussed below, the PTO clutch 60 may be controlled according to an incremental PID feedback control loop.

The PTO transmission 62 gear may be selected manually by the user, or automatically via the controller 52. The PTO transmission 62 may have the same number of gears as the engine transmission 58, or a different number of gears. For example, the PTO transmission 62 may have a high gear and a low gear, selectable by the user (e.g., via the operator interface 54). In other embodiments, the PTO transmission 62 may have more than 2 gears. For example, the PTO transmission 62 may have 2, 3, 4, 5, 6, 7, 8, 9, 10, or any other number of gears.

The controller 52 may include an incremental proportional-integral-derivative (PID) controller for controlling the PTO clutch 60. The specific functionality of the controller 52 is described in more detail below. The controller 52 may include a processor 64, a memory component 66, and communication circuitry 68. The processor 64 may include one or more general-purpose processors, one or more application specific integrated circuits, one or more field programmable gate arrays, or the like. The memory 66 may be any tangible, non-transitory, computer readable medium that is capable of storing instructions executable by the processor 64 and/or data that may be processed by the processor 64. In other words, the memory 66 may include volatile memory, such as random access memory, or non-volatile memory, such as hard disk drives, read-only memory, optical disks, flash memory, and the like. The communication circuitry 68 may be configured to receive inputs (e.g., feedback signals, sensor signals, etc.) and transmit outputs (e.g., control signals, command signals, etc.) to the various components of the drive system 50.

The operator interface 54 may be disposed inside the tractor 10 (e.g., in a cab of the tractor 10) and be configured to display information for, and receive inputs from, the operator. In the illustrated embodiment, the operator interface 54 includes a processor 70, a memory component 72, communication circuitry 74, a display 76, and operator inputs 78. The processor 70 may include one or more general-purpose processors, one or more application specific integrated circuits, one or more field programmable gate arrays, or the like. The memory 72 may be any tangible, non-transitory, computer readable medium that is capable of storing instructions executable by the processor 70 and/or data that may be processed by the processor 70. The memory 72 may include volatile memory, such as random access memory, or non-volatile memory, such as hard disk drives, read-only memory, optical disks, flash memory, and the like. The communication circuitry 74 may be configured to communicate with the controller 52 (e.g., via the communication circuitry 68 of the controller 52). In some embodiments, the communication circuitry 68, 74 may communicate with various components in the drive system 50 wirelessly. In some embodiments, the operator interface 54 and the controller 52 may be disposed within the same housing, and may share processors 64, 70, memory components 66, 72, and/or communication circuitry 68, 74. In further embodiments, the controller 52 and the operator interface 54 may be the same component. The operator interface 54 includes the display 76, which may be configured to display information related to the tractor 10 to the operator. The display 76 may be a screen, an array of LEDs, a series of gauges, a combination thereof, or some other arrangement. The operator interface 54 also includes an operator input 78 that enables a user to input information. The operator input 78 may be a keyboard, a series of buttons, a joystick, a mouse, a track pad, etc. In some embodiments, the display 76 and the operator input 78 may be a single component (e.g., a touchscreen).

Based on inputs received from the operator interface 54 and one or more sensors 80 disposed throughout the system 50, as well as inputs that may be stored in the memory component 56, the controller 52 may output a control signal to one or more of the components within the drive system 50. The drive system 50 has at least one speed sensor 80 to measure the rotational speed of the PTO shaft 20. In some embodiments, the drive system 50 may have a speed sensor to determine the rotational speed of the engine 12. In some embodiments, the engine 12 may have its own dedicated controller (e.g., ECU 82) that controls the operation of the engine 12. In such embodiments, the ECU 82 may be in communication with, or receive instructions from, the controller 52 and/or the operator interface 54. In some embodiments, the controller 52 may receive information (e.g., engine 12 speed) from the ECU 82 rather than a sensor. Accordingly, the ECU 82 may output the engine 12 speed to the controller 52. As shown in FIG. 2, the drive system 50 may include other speed sensors 80 disposed at various locations throughout the drive system 50.

Some vehicles 10 (e.g., small frame tractors) may only be equipped with a single shaft speed sensor 80 to measure the rotational speed of the PTO shaft 20. Accordingly, other shaft speeds within the system may be unknown. The disclosed techniques may be used to determine the gear ratio of the PTO transmission 62, and thus, one or more of the other shaft speeds within the system 50. Such information may be useful in controlling the PTO clutch 60, or other components within the drive system 50. In other embodiments, the disclosed techniques may be used to reduce the number of sensors in a tractor 10.

Figure 3:
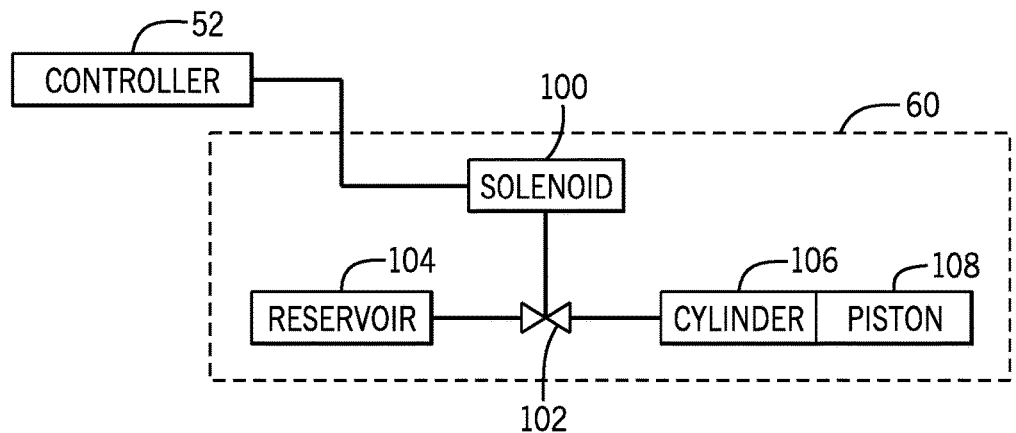
FIG. 3 is a schematic of one embodiment of the PTO clutch shown in FIG. 2.

FIG. 3 is a schematic of the PTO clutch 60. As previously discussed, the controller 52 may output a control signal to one or more of the components within the drive system 50. In the embodiment shown in FIG. 3, the controller 52 outputs a control signal (e.g., a current) to a solenoid 100 within the PTO clutch 60. It should be understood, however, that the use of the solenoid 100 to actuate control of the PTO clutch 60 is merely an example and that other configurations may be possible. The solenoid 100 may actuate a valve 102 between a fluid reservoir 104 and a cylinder 106. The cylinder 106 may include a piston 108, upon which the pressure in the cylinder 106 acts to actuate engagement of the PTO clutch 60. The current of the control signal output to the solenoid 100 may indicate the desired position of the valve 102 (open, closed, partially open, etc.) or commanded pressure in the cylinder 106. The pressure in the cylinder 106 may be indicative of clutch engagement.

PTO clutch 60 engagement is typically controlled using time-based engagement modulation. Time-based engagement modulation may be based on an acceleration of the PTO shaft 20 (shown in FIG. 1) and time. If the load of the implement 24 is too high, the time-based engagement modulation may cause the engine 12 speed (RPM) to drop excessively, or may generate more energy than the PTO clutch 60 is rated to absorb during the engagement. Accordingly, the controller 52 may utilize the incremental PID feedback control loop to control engagement of the PTO clutch 60 to limit an engine 12 power and an energy absorbed by the PTO clutch 60 during the engagement. Rather than using a time-based engagement modulation, the disclosed techniques consider engine 12 power and energy absorbed by the PTO clutch 60 during engagement in controlling the PTO clutch 60. Controlling PTO clutch 60 engagement using a closed loop incremental PID controller 52 that considers engine 12 power and energy absorbed by the PTO clutch 60 may reduce or eliminate engine 12 speed drop and reduce or eliminate instances in which the energy absorbed by the PTO clutch 60 exceeds the energy rating of the PTO clutch 60. For example, the controller 52 may be configured to cease engagement if the estimated energy absorbed by the PTO clutch 60 during the engagement exceeds the energy rating of the PTO clutch 60. The values of the incremental PID gains determine how quickly engagement occurs. The disclosed embodiments include three types of engagement: high aggressive, medium aggressive, and low aggressive. However, it should be understood, that embodiments with different numbers of aggressiveness types are also envisaged. For example, other embodiments may have 1, 2, 3, 4, 5, 6, 7, 8, 9, 10, or more aggressiveness types. In other embodiments, the various aggressiveness types may not be a series of discrete values, but a continuous spectrum of values.

Figure 4:
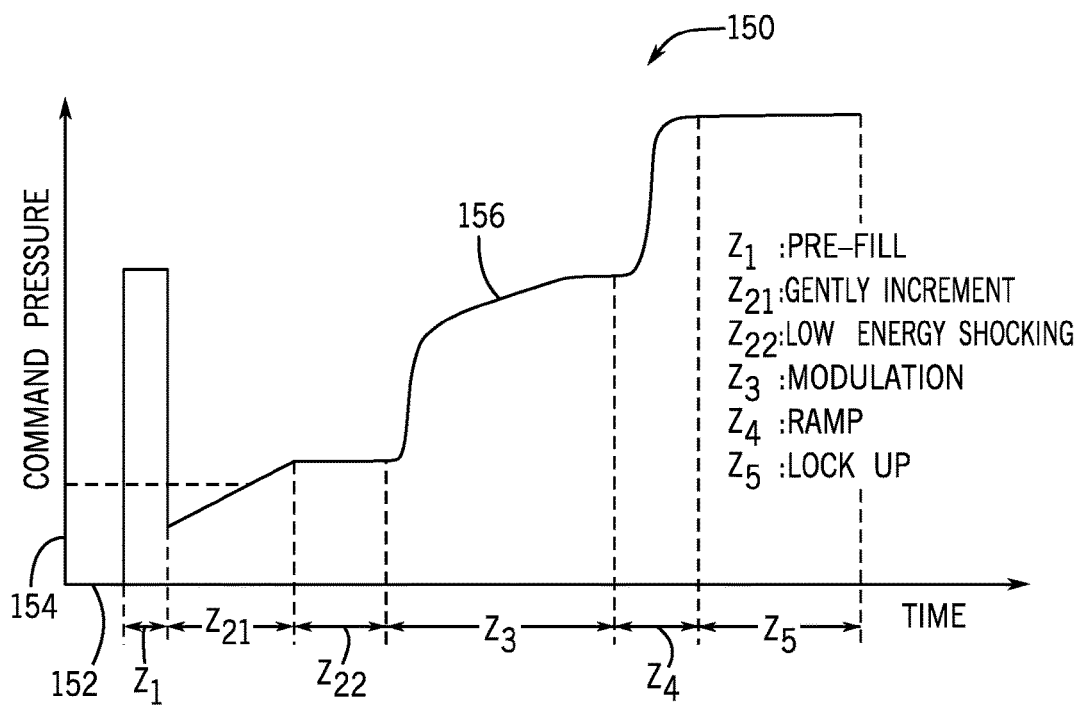
FIG. 4 is a graph of a commanded pressure in the PTO clutch cylinder shown in FIG. 3 versus time in each of five modes, in accordance with an embodiment.

The incremental PID control logic used by the controller 52 to control the PTO clutch 60 engagement in the tractor 10 has five modes, which will be described in more detail below: pre-fill, fill, modulation, ramp to steady, and locked up. The fill mode may include two submodes: gentle increment and low energy shocking. FIG. 4 is a graph 150 of one embodiment of the commanded pressure in the PTO clutch cylinder 106 (communicated via the control signal sent to the solenoid 100 discussed with regard to FIG. 3) versus time in each of the five modes. In graph 150, the x-axis 152 represents time and the y-axis 154 represents the commanded pressure in the cylinder 102, as commanded by the controller 52 via the control signal. Line 156 represents the commanded pressure in the cylinder 106 over time. The pre-fill mode is represented by $Z_1$, the fill mode is represented by $Z_{21}$ and $Z_{22}$ (the gentle increment submode and the low energy shocking submode, respectively), the modulation mode is represented by $Z_3$, the ramp mode is represented by $Z_4$, and the lock up mode is represented by $Z_5$.

If the PTO shaft 20 speed (e.g., after the PTO transmission 62) is detected (e.g., via the sensor 80) to be zero, the controller enters the pre-fill mode $Z_1$. If the PTO shaft 20 speed (e.g., after the PTO transmission 62) is detected (e.g., via the sensor 80) to be nonzero, the pre-fill mode is skipped and the controller 52 proceeds to the modulation mode $Z_3$.

In the pre-fill mode, indicated by $Z_1$ in FIG. 4, the control signal sent by the controller 52 to the solenoid 100 instructs the solenoid 100 to open the valve 102, allowing fluid (e.g., oil) to flow from the reservoir 104 to the cylinder 106, increasing the pressure in the cylinder 106. Fluid fills the PTO clutch cylinder 106 until the pressure in the cylinder 106 reaches the commanded pressure. Once the pressure in the cylinder 106 reaches the commanded pressure, the controller proceeds to fill mode, indicated by $Z_{21}$ and $Z_{22}$ in FIG. 4.

The fill mode, indicated by $Z_{21}$ and $Z_{22}$ in FIG. 4, begins with the gentle increment $Z_{21}$ submode followed by the low energy shock $Z_{22}$ submode, as shown in FIG. 4. In the gentle increment submode $Z_{21}$, the controller gradually (e.g., linearly) increases the pressure in the cylinder 106. In low energy shock mode $Z_{22}$, the controller continues to increase the pressure in the cylinder 106, but at a slower rate than in the gentle increment submode $Z_{21}$. If at any point during the fill mode, the controller 52 determines that the PTO shaft 20 speed is greater than zero, the controller 52 proceeds to the modulation mode $Z_3$.

In modulation mode, indicated by $Z_3$ in FIG. 4, the pressure in the cylinder is increased and the speed of the PTO shaft 20 is increased. When the PTO clutch 60 is fully disengaged, the gear ratio across the PTO clutch 60 (e.g., the rotational speed of the shaft, in RPM, after the clutch divided by the rotational speed of the shaft, in RPM before the shaft) is zero. When the PTO clutch 60 is fully engaged, the shaft before the PTO clutch 60 rotates at the same speed as the shaft after the PTO clutch 60. Accordingly, when the PTO clutch 60 is fully engaged, the gear ratio across the PTO clutch 60 (e.g., the rotational speed of the shaft, in RPM, after the clutch divided by the rotational speed of the shaft, in RPM before the shaft) is 1. During modulation mode, as the rotational speed of the PTO shaft 20 increases, the gear ratio across the PTO clutch 60 also increases. When the gear ratio across the PTO clutch 60 reaches a threshold value (e.g., 0.92), the controller 52 proceeds to the ramp mode. In the present embodiment, the threshold gear ratio is 0.92, however other values may be possible. For example, the threshold gear ratio may be 0.7, 0.75, 0.8, 0.85, 0.87, 0.89, 0.9, 0.91, 0.92, 0.93, 0.94, 0.95, 0.96, 0.97, 0.98, 0.99, or any other value. In the ramp mode, indicated by $Z_4$ in FIG. 4, the controller 52 utilizes an open loop to increase the control signal to the maximum current in a given period of time (e.g., 1 second). The modulation and ramp modes will be discussed in more detail below.

During engagement, the PTO clutch 60 applies a torque T to the load (e.g., the implement 24, via the PTO shaft 20) defined by:

$$T = \mu_{dyn} NPAR_{eq} sgn|\omega|, \quad (1)$$

where T is the torque applied from the PTO clutch 60 to the load 24 (e.g., via the PTO shaft 20), $\mu_{dyn}$ is the coefficient of kinetic friction, N is number of friction surfaces, P is the PTO clutch 60 cylinder 106 pressure, A is the engagement surface area, $\omega$ is the relative angular velocity or slip, and $R_{eq}$ is effective torque radius, which may be defined by:

$$R_{eq} = 2R_o^3 - R_i^3 / 3R_o^2 - R_i^2, \quad (2)$$

where $R_o$ and $R_i$ are the outer and inner radii, respectively, of each friction surface. The conversion from torque T to pressure P in the cylinder 106 is defined by:

$$P = T/\mu_{dyn} NAR_{eq} sgn|\omega|. \quad (3)$$

Figure 5:
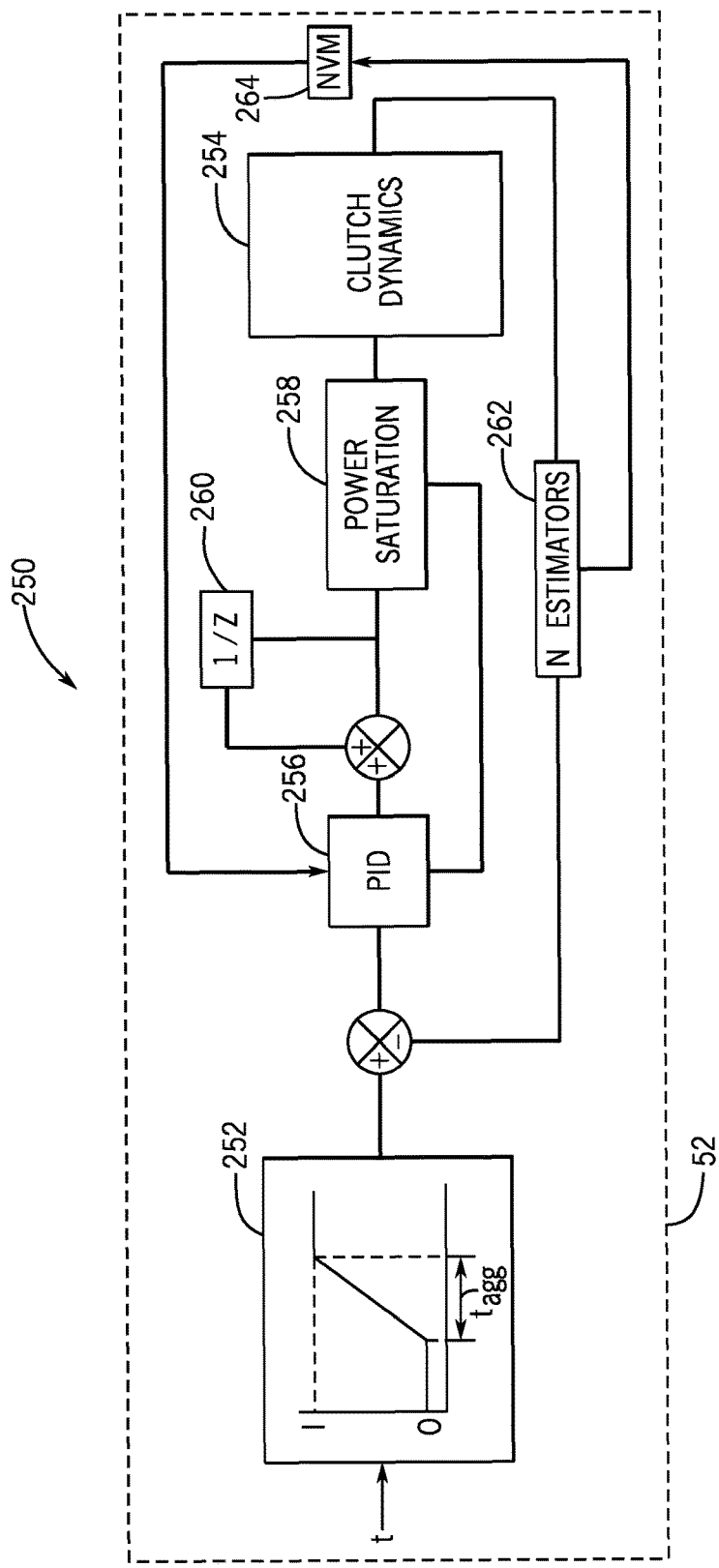
FIG. 5 is a block diagram of one embodiment of an incremental PID controller.

FIG. 5 is a block diagram 250 of one embodiment of the disclosed incremental PID controller 52. The gear ratio is zero when there is no engagement, the drive shaft 16 is rotating, and the PTO shaft 20 is not rotating. The target normalized gear ratio across the PTO clutch 60 for full engagement is 1. The gear ratio across the PTO clutch 60 may be determined by the controller 52 as a function of the commanded gear ratio as time t ranges from zero to $t_{agg}$, where $t_{agg}$, is the time of engagement. This is illustrated by block 252 of FIG. 5. For the highly aggressive type engagement, the value $t_{agg}$ may be 1 second. For medium aggressive type engagement, the value $t_{agg}$ may be 1.5 seconds. For low aggressive type engagement, the value $t_{agg}$ may be 2 seconds.

PTO clutch 60 dynamics (e.g., the rotational speed of the shaft before and/or after the clutch) may be determined in blocks 254 and 262. As will be described with regard to FIG. 6, if one of the shaft speeds (before or after the clutch) is not measured, the shaft speed may be determined by the N estimators 262, wherein the number of estimators (N) corresponds to the number of gear options in the PTO transmission 62. The PTO clutch 60 dynamics are combined with the time of engagement $t_{agg}$ and input to the PID controller (block 256). The shaft speed output from the estimators 262 may be saved in memory 264 (e.g., nonvolatile memory). The power saturation (e.g., the power output of the engine 12 as a ratio of the power rating of the clutch) may be determined in block 258 and fedback to the PID controller (block 256).

Based on the inputs, the PID controller (block 256) may determine energy absorbed by the PTO clutch 60 by integrating power dissipation, defined by:

$$E = \int_0^t Power\, dt = \int_0^t T\omega dt. \quad (5)$$

If the energy absorbed by the PTO clutch 60 is more than the maximum energy rating of the clutch, the PTO controller 52 may stop providing current, terminate the engagement, and generate an error.

The PID controller (block 256) outputs an incremental torque ($PID(n_{gear})$), which may be added to the current measured torque $T_k$ (block 260), to generate the commanded torque $T_{k+1}$, as discussed above with regard to Equation 4. The commanded torque $T_{k+1}$ may correspond to a commanded pressure in the cylinder 106 and/or a current of the command signal. Using an equation or a look-up table, the controller 52 may determine the current of the control signal to the solenoid 100 to achieve the commanded cylinder 106 pressure. Accordingly, the controller 52 may output the calculated current to the solenoid 100 as part of the control signal.

The controller 52 may also include a maximum engagement time, after which the attempted engagement is ceased and an error is generated if there is no engagement. For example, in some embodiments, the maximum engagement time $t_{lockup}$ may be set at 15 seconds. In other embodiments, $t_{lockup}$ may be 5 seconds, 10 seconds, 20 seconds, 25 seconds, 30 seconds, or any other number. If time t reaches 15 seconds and there is no engagement, the attempted engagement is ceased and an error is generated. In other embodiments, the maximum engagement time $t_{lockup}$ may be set at 5, 6, 7, 8, 9, 10, 11, 12, 13, 14, 15, 16, 17, 18, 19, 20, 21, 22, 23, 24, 25, 26, 27, 28, 29, or 30 seconds. Once the normalized gear ratio reaches the set threshold value (e.g., 0.92 out of 1) in a time period of less than the maximum engagement time (e.g., t<15 seconds) for a threshold period of time (e.g., at least 0.1 seconds), the controller 52 proceeds to the ramp mode. Though in the present embodiment, the threshold time period is 0.1 seconds, in other embodiments, the threshold time period could be set at 0.01 seconds, 0.05 seconds, 0.2 seconds, 0.3 seconds, 0.5 seconds, 0.6 seconds, or any other value. The ramp mode $Z_4$ utilizes an open loop to increase the PTO clutch 60 to the maximum torque, maximum current, and/or maximum cylinder 106 pressure in 1 second, for example. However, the ramp mode time period may be 0.5 seconds, 0.75 seconds, 1.25 seconds, 1.5 seconds, 1.75 seconds, 2 seconds, 2.5 seconds, 3 seconds, 4 seconds, or any other value.

Once the maximum torque or maximum current has been reached, or the ramp mode time period (e.g., 1 second) passes, the controller proceeds to the lock up mode and locks up the clutch. In the lock up mode, the controller reduces the current to zero, the clutch is locked up, and the PTO shaft 20 is coupled to, and driven by, the engine 12. If at any point during operation, the command from the controller 52 is to disconnect the load 24, the controller 52 also proceeds to lock up mode. Upon lock up of the PTO clutch, the PTO shaft 20 will be driven by the engine 12.

Figure 6:
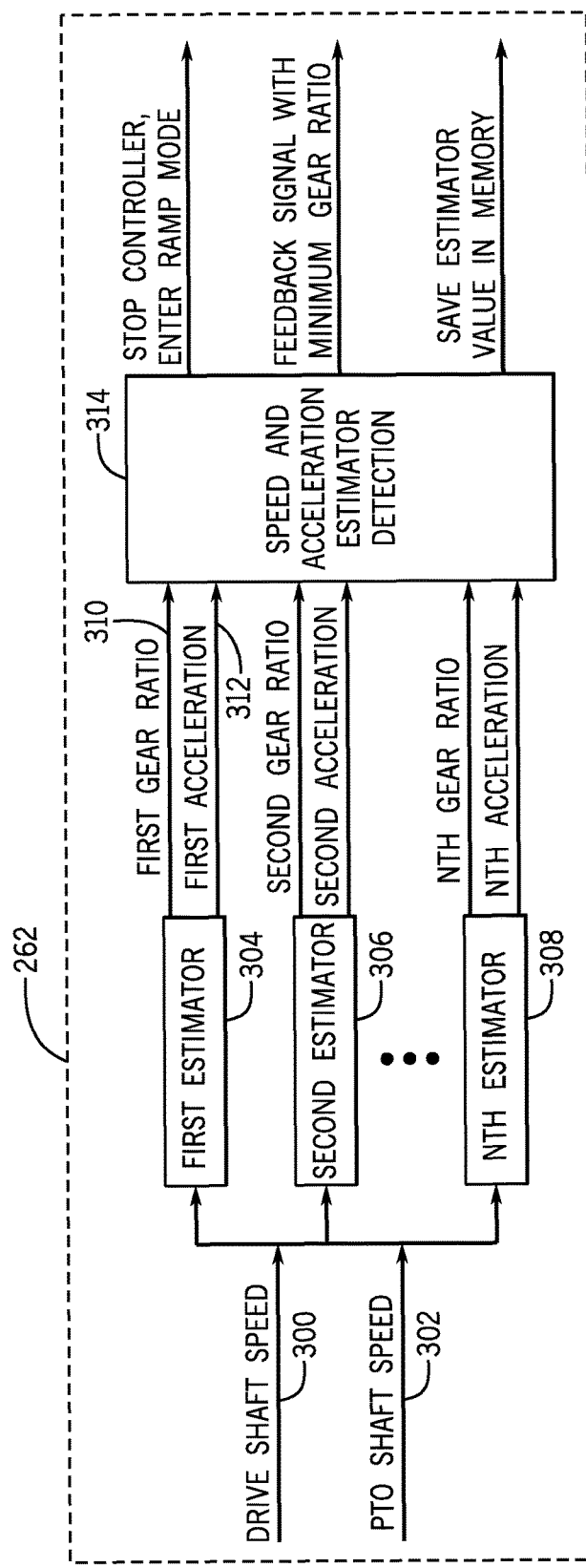
FIG. 6 is a schematic of the estimators shown in FIG. 5.

FIG. 6 is a schematic illustrating the function of the estimators 262 shown in FIG. 5. The estimators 262 receive the drive shaft speed 300 and the PTO shaft speed 302 as inputs. The drive shaft speed 300 may be directly measured via a sensor, or may be determined based on the known engine 12 speed (e.g., from the ECU 82) multiplied by a commanded engine transmission 58 gear ratio. As shown in FIG. 6, the estimators 252 include a first estimator 304, a second estimator 306, and an $N^{th}$ estimator 308. The number of estimators 262 may be equal to the number of gear options in the PTO transmission 62. In the proceeding discussion, it is assumed that the PTO transmission 62 is a 2-speed transmission. However, embodiments having PTO transmissions 62 with a different number of gears are also possible. Each estimator 262 is assigned to one of the gear ratios of the PTO transmission 62. For example, the first estimator 304 may be assigned to a gear ratio of 53/28. The second estimator 306 may be assigned to a gear ratio of 65/18. It should be understood, however, that these gear ratios are merely examples and that other gear ratios may be possible.

Each estimator 262 calculates a normalized gear ratio across the PTO transmission assembly 18 assuming that the PTO transmission 62 is in the gear assigned to that estimator 262. For example, the first estimator multiplies the measured PTO shaft speed 302 by the low gear ratio, divided by the drive shaft speed 300. If the measured PTO shaft speed 302 is 498.4615 rpm, the low gear ratio is 53/28, and the drive shaft speed 300 is 1800 rpm, then the calculation for the normalized gear ratio across the PTO transmission assembly 18, assuming the PTO transmission 62 is in the low gear, is (498.4615*53/28)/1800=0.5242. Similarly, the second estimator multiplies the measured PTO shaft speed 302 by the high gear ratio, divided by the drive shaft speed 300. If the measured PTO shaft speed 302 is 498.4615 rpm, the low gear ratio is 65/18, and the drive shaft speed 300 is 1800 rpm, then the calculation for the normalized gear ratio across the PTO transmission assembly 18, assuming the PTO transmission 62 is in the high gear, is (498.4615*65/18)/1800=1.

Each estimator 262 outputs the calculated normalized gear ratio 310 and the PTO shaft acceleration 312. If the shaft acceleration 312 is below a threshold value (i.e., the measured shaft speed has reached, or is nearing, steady state) and the normalized gear ratio is 1, then it can be assumed that the engine 12 is driving the PTO shaft 20 and the PTO transmission 62 is in the gear assigned to the estimator 252. That is, the PTO shaft speed 302 multiplied by the gear ratio of the PTO transmission 62 should be equal to the drive shaft speed 300 is the PTO clutch 60 is locked up. Alternatively, if the shaft acceleration 312 is below a threshold value and the normalized gear ratio is not 1, then it can be assumed that the engine 12 is driving the PTO shaft 20 and the PTO transmission 62 is not in the gear assigned to the estimator 252.

The normalized gear ratios 310 and PTO shaft accelerations 312 output by the estimators 262 and received (e.g., by the controller 52). Speed and acceleration estimator detection 314 is then performed. As previously discussed, the lowest known gear is initially assumed. When the measured PTO shaft speed 302 stabilizes (e.g., the PTO shaft 20 acceleration is below a threshold value), the estimator outputting a normalized gear ratio 310 at or near 1 is selected. The outputs of the estimators 262 may be saved in memory 66. The PTO transmission 62 gear ratio assigned to the selected estimator 262 is then assumed to be the gear that the PTO transmission 62 is in for purposed of controlling the PTO clutch 60. Based on the gear ratio of the selected estimator 262, the controller 52 may stop incrementing and proceed to ramp mode (indicated by Z4 of FIG. 4), generate a feedback signal based on the gear ratio of the selected estimator 262, or save the estimator outputs 310, 312 in memory.

Figure 7:
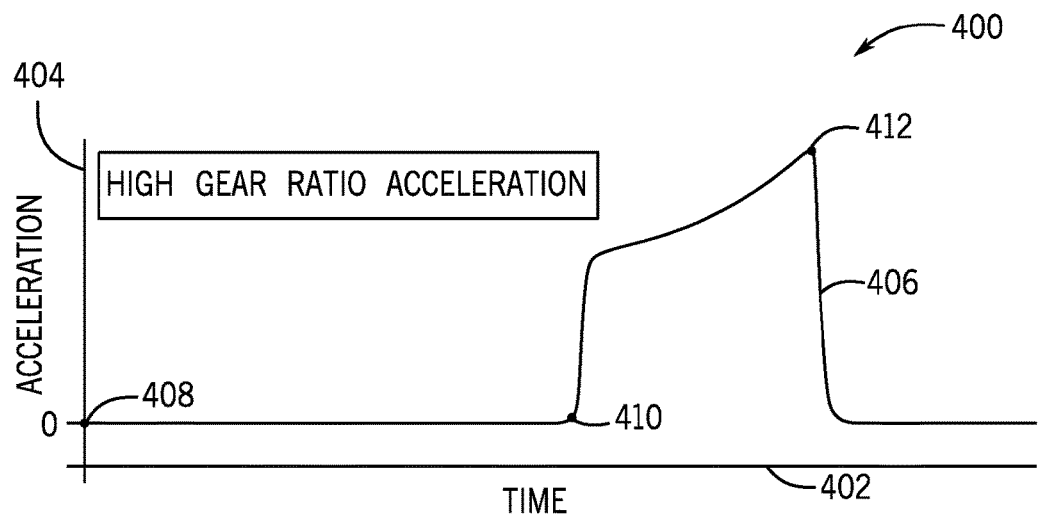
FIG. 7 is graph of PTO shaft acceleration during a clutch engagement and lock up, in accordance with an embodiment.
Figure 8:
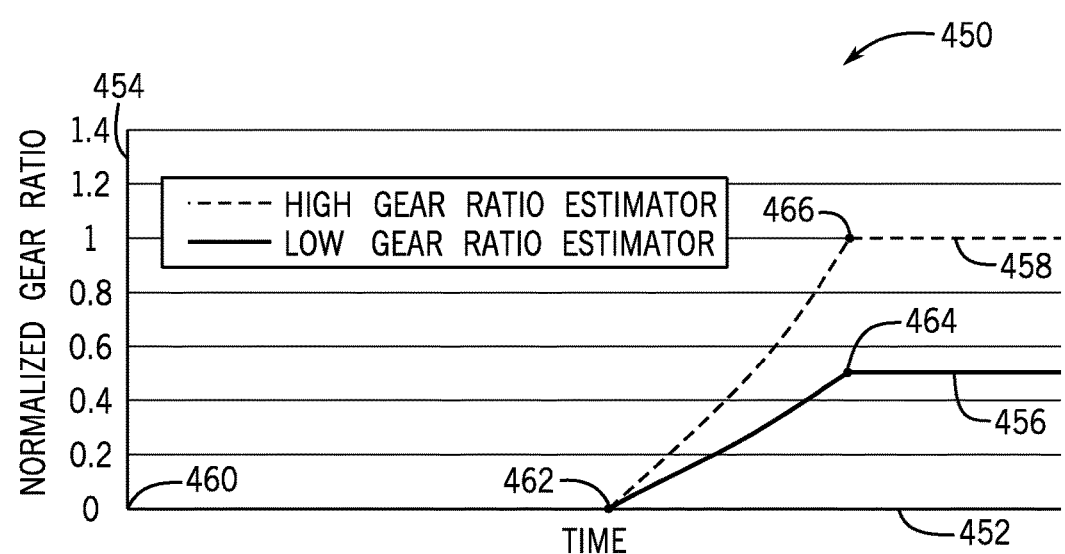
FIG. 8 is a graph of normalized gear ratios output by the first and second estimators during the example PTO clutch engagement and lock up shown in FIG. 7.

FIGS. 7 and 8 illustrate the PTO shaft acceleration 312 and the normalized gear ratios 310 output by two estimators 304, 306 during an example PTO clutch 60 engagement and lock up. FIG. 7 is a graph 400 of the PTO shaft acceleration 312 during a clutch engagement and lock up (e.g., to change gears of the PTO transmission or engage the PTO shaft 20 and the drive shaft 16). The X-axis 402 represents time. The Y-axis 404 represents PTO shaft acceleration 312. Line 406 represents the PTO shaft acceleration 312 over time over the course of a clutch engagement and lock up. As shown, between points 408 and 410, the PTO shaft acceleration 312 is zero or near zero. This may indicate that the PTO shaft 20 is not rotating (e.g., not being driven by the drive shaft 16), or rotating at a constant speed. At point 410 the PTO shaft acceleration 312 ramps up, indicating that the PTO clutch 60 has been engaged and is ramping up the speed of the PTO shaft 20 to match the speed of the drive shaft 16. As the speed of the PTO shaft 20 reaches the speed of the drive shaft 16, the PTO shaft acceleration 312 drops back down to zero (after point 412) as the PTO clutch 60 locks up. The PTO shaft acceleration 312 reaches zero as the engine 12 rotates the PTO shaft 20 via the drive shaft 16 at a constant speed.

FIG. 8 is a graph 450 of the normalized gear ratios 310 output by the first and second estimators 304, 306 during the example PTO clutch 60 engagement and lock up shown in FIG. 7. The X-axis 452 represents time. The Y-axis 454 represents normalized gear ratio 310. Line 456 represents the normalized gear ratio 310 output by the first estimator 304 (e.g., the low gear estimator) over time. Line 458 represents the normalized gear ratio 310 output by the second estimator 306 (e.g., the high gear estimator) over time. Between points 460 and 462, the normalized gear ratio 310 output by both estimators 304, 306 is zero, indicating that the PTO shaft 20 is likely not rotating. Note that the zero normalized gear ration 310 between points 460 and 462 generally corresponds to the time of zero PTO shaft acceleration 312 between points 408 and 410 in FIG. 7. Similarly, notice that point 410 in FIG. 7 roughly corresponds to point 462 in FIG. 8. As the PTO shaft 20 accelerates to match the speed of the drive shaft 16, the normalized gear ratios 310 output by the estimators 304, 306 begin to ramp up. Note that the normalized gear ratio 310 output by the second estimator 306 (i.e., the high gear estimator) increases at a faster rate than the normalized gear ratio 310 output by the first estimator 304 (i.e., the low gear estimator). The normalized gear ratio 310 output by the first estimator 304 (i.e., the low gear estimator) increases to point 464 at a normalized gear ratio of about 0.5, and then remains flat. The normalized gear ratio 310 output by the second estimator 306 (i.e., the high gear estimator) increases to point 466, at a normalized gear ratio of about 1, occurring at the same time as point 464, and then remains flat. Note that the stabilizing of the normalized gear ratios 310 output by the estimators 304, 306 roughly correspond to the PTO shaft acceleration 312 falling back to zero.

When the output PTO shaft acceleration drops below a threshold value (e.g., at or near zero), the normalized gear ratios 310 output by the estimators 304, 306 will have stabilized. The controller 52 may then evaluate the normalized gear ratios 310. A normalized gear ratio 310 of 1 indicates that the PTO transmission 62 is in the gear assigned to that estimator. In the example shown in FIGS. 7 and 8, the normalized gear ratio 310 of the second estimator 306 (i.e., the high gear estimator) settled at 1, indicating that the PTO transmission 62 is in the gear assigned to the second estimator 306 (e.g., 65/18) and not the gear assigned to the first estimator 304 (e.g., 53/28). When the gear ratio is known, the controller 52 may then combine the determined gear ratio with measured parameters in order to determine other operational parameters within the drive system 50. Thus, the controller 52 may control the PTO clutch 60, or other components within the system based on the determined gear ratio.

Figure 9:
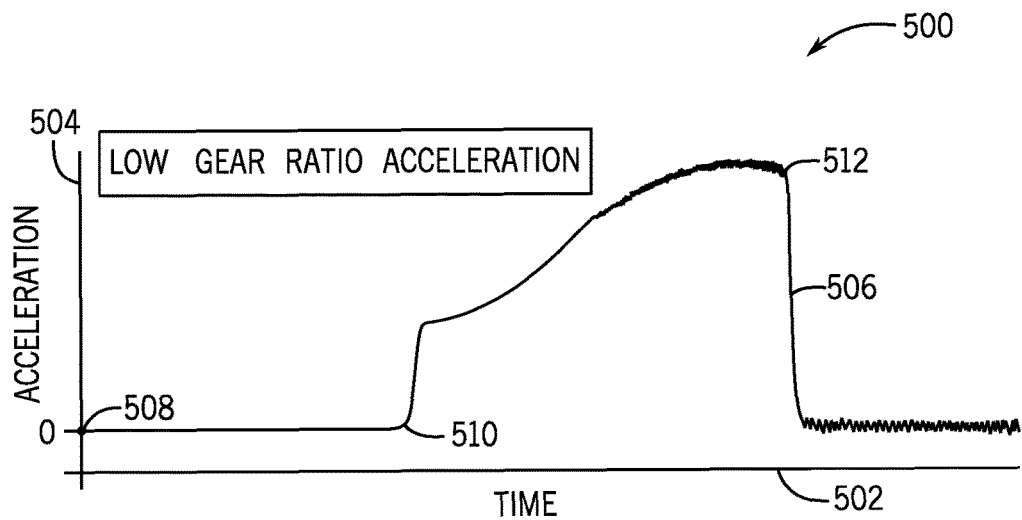
FIG. 9 is a graph of PTO shaft acceleration during a second PTO clutch engagement and lock up, in accordance with an embodiment.
Figure 10:
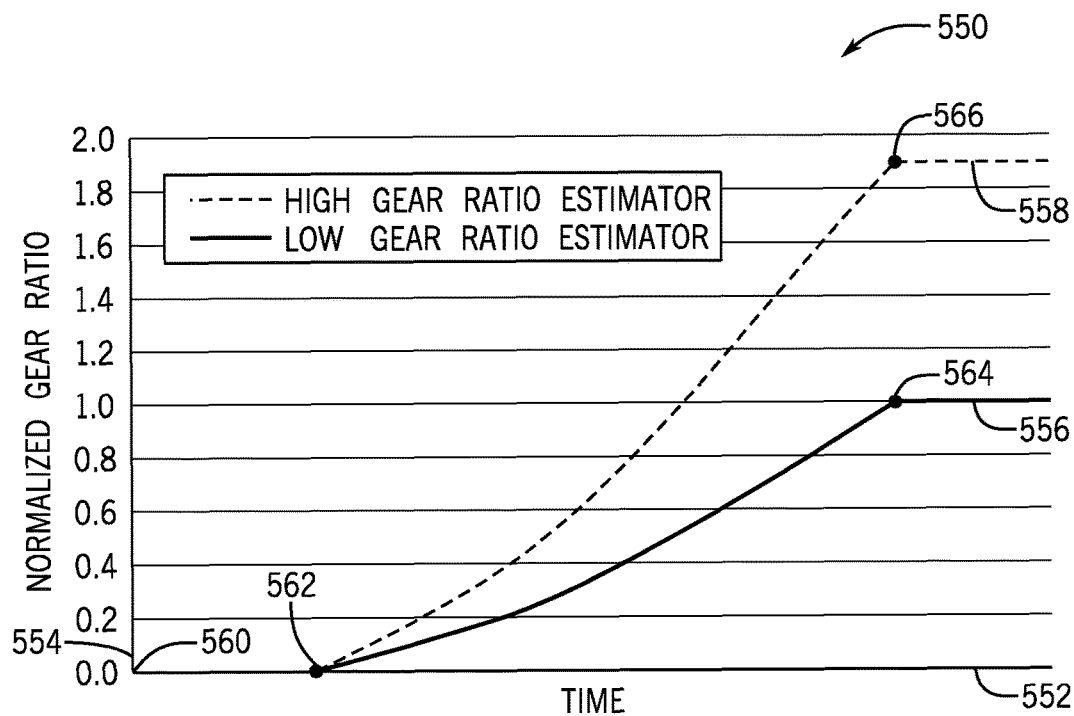
FIG. 10 is a graph of the normalized gear ratios output by the first and second estimators during the example PTO clutch engagement and lock up shown in FIG. 9, in accordance with an embodiment.

FIGS. 9 and 10 illustrate the PTO shaft acceleration 312 and the normalized gear ratios 310 output by two estimators 304, 306 during a second example PTO clutch 60 engagement and lock up. FIG. 9 is a graph 500 of the PTO shaft acceleration 312 during a second PTO clutch engagement and lock up. The X-axis 502 represents time. The Y-axis 504 represents PTO shaft acceleration 312. Line 506 represents the PTO shaft acceleration 312 over time over the course of a clutch engagement and lock up. As shown, between points 508 and 510, the PTO shaft acceleration 312 is zero or near zero. This may indicate that the PTO shaft 20 is not rotating. At point 510 the PTO shaft acceleration 312 begins to increase, indicating that the PTO clutch 60 has been engaged and is ramping up the speed of the PTO shaft 20 to match the speed of the drive shaft 16. As the speed of the PTO shaft 20 reaches the speed of the drive shaft 16, the PTO shaft acceleration 312 drops back down to zero (after point 512) as the PTO clutch 60 locks up. The PTO shaft acceleration 312 reaches zero as the engine 12 rotates the PTO shaft 20 via the drive shaft 16 at a constant speed.

FIG. 10 is a graph 550 of the normalized gear ratios 310 output by the first and second estimators 304, 306 during the same example PTO clutch 60 engagement and lock up shown in FIG. 9. The X-axis 552 represents time. The Y-axis 554 represents normalized gear ratio 310. Line 556 represents the normalized gear ratio 310 output by the first estimator 304 (e.g., the low gear estimator) over time. Line 558 represents the normalized gear ratio 310 output by the second estimator 306 (e.g., the high gear estimator) over time. Between points 560 and 562, the normalized gear ratio 310 output by both estimators 304, 306 is zero, indicating that the PTO shaft 20 is likely not rotating. Note that the zero normalized gear ratio 310 between points 560 and 562 generally corresponds to the time of zero PTO shaft acceleration 312 between points 508 and 510 in FIG. 9. Similarly, point 510 in FIG. 9 roughly corresponds to point 562 in FIG. 10. As the PTO shaft 20 accelerates to match the speed of the drive shaft 16, the normalized gear ratios 310 output by the estimators 304, 306 begin to ramp up. Note that the normalized gear ratio 310 output by the second estimator 306 (i.e., the high gear estimator) increases at a faster rate than the normalized gear ratio 310 output by the first estimator 304 (i.e., the low gear estimator). The normalized gear ratio 310 output by the first estimator 304 (i.e., the low gear estimator) increases to point 564 at a normalized gear ratio of about 1, and then remains flat. The normalized gear ratio 310 output by the second estimator 306 (i.e., the high gear estimator) increases to point 566, at a normalized gear ratio of about 1.9, occurring at the same time as point 564, and then remains flat. Note that the stabilizing of the normalized gear ratios 310 output by the estimators 304, 306 roughly correspond to the PTO shaft acceleration 312 falling back to zero.

When the output PTO shaft acceleration drops below a threshold value (e.g., at or near zero), the controller 52 evaluates the normalized gear ratios 310. A normalized gear ratio 310 of 1 indicates that the PTO transmission 62 is in the gear assigned to that estimator. In the example shown in FIGS. 9 and 10, the normalized gear ratio 310 of the first estimator 304 (i.e., the low gear estimator) settled at 1, indicating that the PTO transmission 62 is in the gear assigned to the first estimator 304 (e.g., 53/28) and not the gear assigned to the second estimator 306 (e.g., 65/18). When the gear ratio is known, the controller 52 may then combine the determined gear ratio with measured parameters in order to determine other operational parameters within the drive system 50 and control the PTO clutch 60, or other components within the system based on the determined gear ratio.

Figure 11:
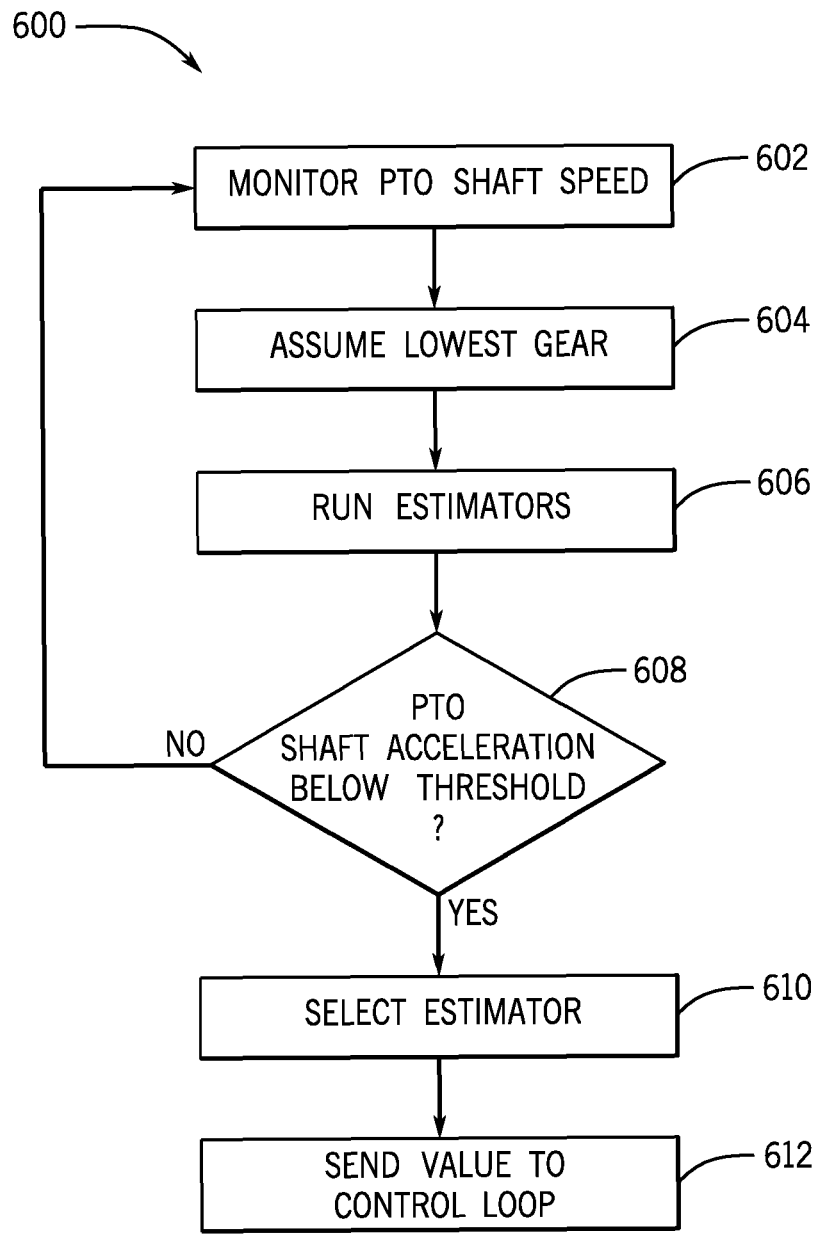
FIG. 11 is a flow chart of one embodiments of a process for determining the effective gear ratio of the PTO transmission, in accordance with an embodiment.

FIG. 11 is a flow chart of a process 600 for determining the effective gear ratio of the PTO transmission 62. In block 602 the PTO shaft speed 302 (e.g., output by the sensor 80) is monitored. The PTO shaft speed 302 may be monitored over time in order to derive the acceleration 312 of the PTO shaft 20. Additionally, the drive shaft speed 300 may be measured directly or determined based upon the engine 12 speed (e.g., output by the ECU 82) and multiplied by the known or commanded engine transmission 58 gear ratio. In block 604, the lowest gear ratio of the PTO transmission 62 is assumed. Assuming the lowest gear ratio initially will cause the estimators 262 to run for the longest period of time.

In block 606 the estimators 262 are run. As discussed above with respect to FIG. 6, the estimators receive the drive shaft speed 300 and the PTO shaft speed 302. The number of estimators 262 matches the number of gear options in the PTO transmission 62. Each estimator 262 is assigned a gear ratio that corresponds to the gear options in the PTO transmission 62. Each estimator outputs a normalized gear ratio 310 and PTO shaft acceleration 312.

In decision 608, the output PTO shaft acceleration 312 is compared to a threshold value. If the PTO shaft acceleration 312 is above the threshold value, the process 600 returns to block 602 and continues to monitor the PTO shaft speed 302. If the PTO shaft acceleration 312 is below the threshold value, the estimator outputting the normalized gear ratio closest to 1 is selected. In block 612, the PTO transmission gear ratio assigned to the selected estimator 262 is sent to the control loop 250 by which the controller 52 controls the PTO clutch 60 and/or other components within the drive system 50.

By using the known PTO transmission 62 gear ratio options and the PTO shaft 20 speed to determine the gear ratio of the PTO transmission 62, and other shaft speeds within the system 50, the controller 52 may control the PTO clutch 60 according to an incremental PID control loop 250. Thus, the disclosed techniques may be used to utilize an incremental PID control of a PTO clutch 60 in vehicles 10 with a single shaft sensor 80, or to reduce the number of sensors 80 in a vehicle 10.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method, comprising:
receiving a first shaft speed;
measuring a parameter indicative of a power take-off (PTO) shaft speed;
determining a PTO shaft acceleration by monitoring the parameter indicative of the PTO shaft speed over time;
determining, via a plurality of estimators, a plurality of normalized PTO clutch gear ratios, wherein each of the plurality of estimators determines one of the plurality of normalized PTO clutch gear ratios based, at least in part, on the first shaft speed, the PTO shaft speed, and one of a plurality of known PTO transmission gear ratio options; and
selecting one of the plurality of estimators, when the PTO shaft acceleration drops below a threshold value, wherein the selected estimator is the normalized PTO clutch gear ratio that is closest to 1,
controlling a PTO clutch based, at least in part, on the known PTO transmission gear ratio associated with the selected estimator of the plurality of estimators.

2. The method of claim 1, comprising storing the known PTO transmission gear ratio associated with the selected estimator of the plurality of estimators in memory.

3. The method of claim 1, wherein the first shaft speed comprises a drive shaft speed.

4. The method of claim 1, comprising receiving the first shaft speed from an engine control unit (ECU).

5. The method of claim 4, comprising receiving a commanded vehicle transmission gear ratio from the ECU.

6. The method of claim 5, comprising determining a drive shaft speed based, at least in part, on the first shaft speed and the commanded vehicle transmission gear ratio.

7. The method of claim 1, wherein the known PTO transmission gear ratio options comprise a low gear ratio and a high gear ratio.

8. The method of claim 7, comprising assuming a PTO transmission is in the low gear ratio.

9. A system, comprising:
a sensor configured to sense a parameter indicative of a power take-off (PTO) shaft speed;
a controller comprising:
communication circuitry configured to receive a first shaft speed;
a processor configured to determine a PTO shaft acceleration by monitoring the parameter indicative of the PTO shaft speed over time; and
a plurality of estimators, wherein each of the plurality of estimators is assigned one of a plurality of known PTO transmission gear ratio options, and wherein each estimator is configured to determine a normalized PTO clutch gear ratio based, at least in part, on the first shaft speed, the PTO shaft speed, and the PTO transmission gear ratio assigned to the estimator;
wherein the controller is configured to select the estimator of the plurality of estimators outputting the normalized PTO clutch gear ratio closest to 1 when the PTO shaft acceleration drops below a threshold value,
wherein the controller is configured to control a PTO clutch based, at least in part, on the known PTO transmission gear ratio assigned to the selected estimator of the plurality of estimators.

10. The system of claim 9, wherein the controller is configured save the known PTO transmission gear ratio assigned to the selected estimator of the plurality of estimators to memory.

11. The system of claim 9, wherein the first shaft speed comprises a drive shaft speed.

12. The system of claim 9, wherein the first shaft speed comprises an engine speed received from an engine control unit (ECU).

13. The system of claim 12, wherein the communication circuitry is configured to receive a commanded vehicle transmission gear ratio from the ECU.

14. The system of claim 12, wherein the processor is configured to determine a drive shaft speed based, at least in part, on the received engine speed and the received commanded vehicle transmission gear ratio.

15. The system of claim 9, comprising a memory component configured to store the PTO transmission gear ratio assigned to the selected estimator of the plurality of estimators.

16. A non-transitory computer readable medium comprising executable instructions that when executed cause a processor to:
determine a PTO shaft acceleration by monitoring a received parameter indicative of a power take-off (PTO) shaft speed over time;
determine a plurality of normalized PTO clutch gear ratios, wherein each of the plurality of normalized PTO clutch gear ratios is determined based, at least in part, on a drive shaft speed, the PTO shaft speed, and one of a plurality of known PTO transmission gear ratio options;
select one of the plurality of normalized PTO clutch gear ratios, when the PTO shaft acceleration drops below a threshold value, wherein the normalized PTO clutch gear ratio that is closest to 1 is selected; and
control a PTO clutch based, at least in part, on the known PTO transmission gear ratio associated with the selected normalized PTO clutch gear ratio.

17. The non-transitory computer readable medium comprising executable instructions of claim 16, that when executed cause a processor to determine the drive shaft speed based, at least in part on an engine speed and a commanded vehicle transmission gear ratio received from an engine control unit (ECU).

18. The non-transitory computer readable medium comprising executable instructions of claim 16, wherein control of the PTO clutch is performed according to an incremental proportional-integral-derivative (PID) control loop.

* * * * *